United States Patent
Krishnan et al.

(10) Patent No.: US 12,511,253 B2
(45) Date of Patent: Dec. 30, 2025

(54) DATA CLASSIFICATION FOR VEHICLE NETWORK LOGGER SYSTEM

(71) Applicant: GM Cruise Holdings LLC, San Francisco, CA (US)

(72) Inventors: Narayanan Krishnan, San Francisco, CA (US); Moshe Oron, San Rafael, CA (US); Nathan Falk, San Francisco, CA (US); Adrian Caceres, Belmont, CA (US); Manuel Birke, Los Altos, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 18/401,843

(22) Filed: Jan. 2, 2024

(65) Prior Publication Data

US 2025/0217315 A1 Jul. 3, 2025

(51) Int. Cl.
*G06F 16/11* (2019.01)
*G06F 16/16* (2019.01)
*G06F 16/17* (2019.01)

(52) U.S. Cl.
CPC .......... *G06F 16/125* (2019.01); *G06F 16/162* (2019.01); *G06F 16/1734* (2019.01)

(58) Field of Classification Search
CPC .................. G06F 16/125; G06F 16/162; G06F 16/1734
See application file for complete search history.

(56) References Cited

U.S. PATENT DOCUMENTS

| | | | |
|---|---|---|---|
| 11,036,596 B1 * | 6/2021 | Coleman | H04L 67/568 |
| 2019/0043201 A1 * | 2/2019 | Strong | G06V 10/96 |
| 2019/0043351 A1 * | 2/2019 | Yang | G06V 10/764 |
| 2020/0334125 A1 * | 10/2020 | Degaonkar | H04L 43/0817 |
| 2022/0083245 A1 * | 3/2022 | Kant | G06F 3/0688 |
| 2022/0224776 A1 * | 7/2022 | Doshi | G06F 12/0897 |
| 2024/0087378 A1 * | 3/2024 | Becker | G06F 16/901 |
| 2024/0168923 A1 * | 5/2024 | Sinha | G06F 16/182 |
| 2025/0004888 A1 * | 1/2025 | Garza | G07C 5/008 |
| 2025/0110797 A1 * | 4/2025 | Lydiksen | G06F 3/061 |

* cited by examiner

*Primary Examiner* — Merilyn P Nguyen
(74) *Attorney, Agent, or Firm* — CANTOR COLBURN LLP

(57) ABSTRACT

A vehicle network logging system (VNLS) is described and includes a logger for storing data associated with events, wherein for each of the events, the associated data is created when a trigger associated with the event is received at the VNLS; and a compute node for, for each of the events, subsequent to occurrence of creation of data associated with the event, identifying a data tier for the event, the identified data tier selected from a plurality of data tiers of the VNLS and defined by the trigger associated with the event; and logging the data for the event to an internal disk of the VNLS in the identified data tier, wherein the identified data tier specifies an offload policy and a deletion policy for the data.

20 Claims, 9 Drawing Sheets

DATA CLASSIFICATION FOR VEHICLE NETWORK LOGGER SYSTEM

TECHNICAL FIELD

The present disclosure relates generally to autonomous vehicles (AVs) and, more specifically, to techniques for classification of data logged to a vehicle network logger system (VNLS) in connection with such AVs.

BACKGROUND

An AV is a motorized vehicle that can navigate without a human driver. AVs include computers and control systems that perform driving and navigation tasks that are conventionally performed by a human driver. Such tasks require the collection and processing of large quantities of data using various sensors, including but not limited to, a camera sensor, a light detection and ranging (LIDAR) sensor, and a radio detection and ranging (RADAR) sensor, among others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system. Typically, the sensors are mounted at fixed locations on the AVs.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Overview

Figure 1:
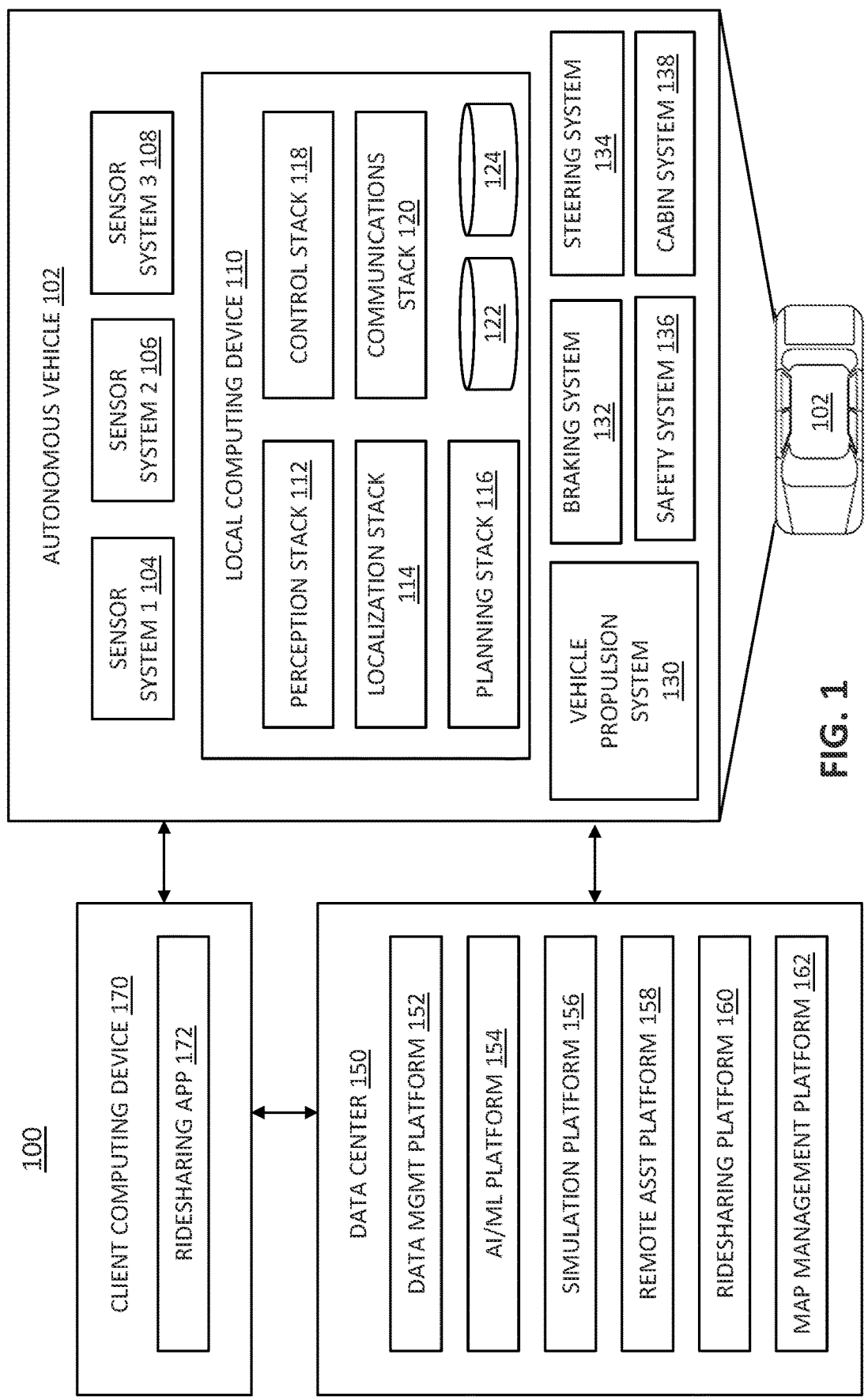
FIG. 1 illustrates an example system environment that can be used to facilitate AV dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Given the numerous advantages of ride hail, rideshare, and delivery services (hereinafter collectively referred to as rideshare services) provided by AVs, it is anticipated that AV provision of such services will soon become the ubiquitous choice for various user transportation and delivery needs, including but not limited to commutes, airport transfers, long distance road trips, and grocery and restaurant deliveries, to name a few.

Throughout operation of an AV, various information in connection with the AV is can be logged by a VNLS. In the context of AVs and as used herein, the term logger refers to an application that stores to persistent media relevant information about various hardware/software devices on AVs (sometimes comprising a fleet of AVs) during operation of the AVs. This data is later uploaded to the cloud for parsing in order to understand what might have happened during a drive and/or recreate a drive in its entirety on equivalent hardware, for example. The saved data may include (1) all input information fed to an AV stack of an AV (for example, all sensor data), (2) the output of any non-deterministic calculations and (3) states of different software modules. The information may be used for a variety of purposes, including debugging of software modules, legal compliance, and performance improvements (especially with regard to the AV stack).

In particular embodiments, AV loggers log selected data (which may comprise all generated data) for the entirety of a drive and store the data to disks. The data may be subsequently offloaded from the disks, e.g., when the AVs return to a garage. As VNLS architecture changes, the size of the data logged on AVs may need to be reduced substantially and methods of manual disk offloading may become less desirable. Moreover, as an AV fleet expands, the amount of data logged may need to be reduced to save on onboard hardware costs, offload times, and offload storage costs. Still further, as sensor traffic between AV automated driving systems computers (ADSCs) and a network switch increases, logging may need to be scaled accordingly.

In particular implementations, data may be stored on and subsequently offloaded from AVs in an uncompressed form, which creates inefficiencies in local storage and offload time. Additionally, all recorded data may be offloaded, including data that is rarely subsequently used, resulting in an unnecessary increase in offload time and cloud storage. Data prioritization may be supported by some embodiments of VNLS, but clear data latency service level agreements (SLAs) and vehicle storage retention requirements may be lacking in these embodiments. Some events that require recording may be difficult to detect in real time. Before the availability of selective, or event-based, logging (as opposed to continuous logging), identifying such instances may rely on post-processing techniques. Continuous logging can meet such needs, but is applied on a very thin subset of the data, due to logging and offload budget limitations. Some events of interest may require a deeper history than common triggers for triaging, replay, etc. Most configurations of selective logging/continuous logging may be static and the ability to customize the operation of selective logging to different data collection needs may be limited.

In accordance with features of embodiments described herein, a classification technique may be applied to VNLS data to ensure that mandatory data is logged, retained, and/or offloaded as required (e.g., by legal requirements, safety considerations, and/or other federal, state, and/or local regulations), while enabling other data (which may be referred to herein as non-mandatory data) to be logged, retained and/or offloaded as opportunities arise in a manner that does not impact the treatment of the mandatory data. In particular embodiments, such non-mandatory data, which may be useful for one reason or another (e.g., for training machine learning (ML) models), but that is not necessary may be requested to be logged opportunistically on the AV using data classifications, or data tiers. Non-mandatory data may be classified in lower priority tiers than mandatory data such that it is only logged on the AV if there is sufficient disk space to do so. Additionally, if mandatory data begins to fill up the disk space, non-mandatory data will be removed to make additional room for mandatory data. Moreover, during offload, non-mandatory data may be prioritized below, and therefore offloaded after and/or under different circumstances, than mandatory data.

In other embodiments, data tiers may be used to implement dynamic data campaigns, or simply campaigns, campaigns initiated by operators via a fleet management system, in which certain types of non-mandatory data are identified to be logged across a fleet of AVs or a subset thereof. In particular embodiments, this may be accomplished by dynamically adding (or in certain cases subtracting) triggers via a central cloud-based source for vehicles deployed in the field. For example, a campaign may be initiated to gather events related to stroller detection in a designated area during a designated time of day. In this example, any AV proceeding through the designated area during the designated time of day will log any stroller detection events if it has space on its disk to do so. In particular aspects of embodiments described herein, data comprising events may be promoted to higher tiers and/or demoted to lower tiers as desired to implement a planned campaign or other business or technological goal. Promotion/demotion of events may occur in response to particular conditions and may be initiated by an operator, by a system, or by the AV itself in various situations. In other particular aspects, a real time or substantially real time event log manifest may be provided to enable disk space and/or campaigns to be monitored so that appropriate adjustments may be made thereto.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110*a*-110*e*), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV Management System

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, a High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as tracking specific changes that (human or machine) map editors have made to the data and reverting changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit in route to a pick-up or drop-off location, and so on.

Example System for Performing Selective Logging

Figure 2:
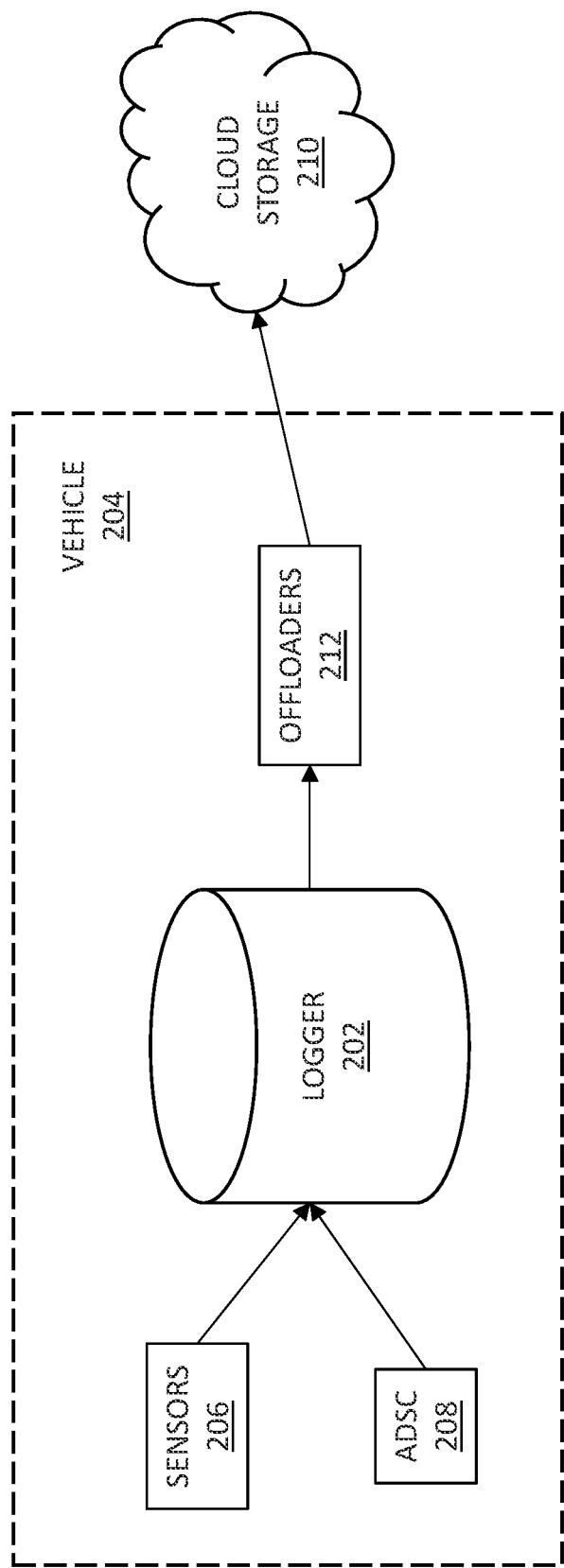
FIG. 2 illustrates a simplified block diagram of a vehicle network logger system (VNLS), according to some aspects of the disclosed technology.

FIG. 2 illustrates a simplified diagram of a system for performing selective logging in a VNLS in accordance with features of particular embodiments. As shown in FIG. 2, system 200 includes a logger 202 installed on a vehicle 204, which may be identical to AV 102 (FIG. 1). Logger 202 may receive data from onboard sensors 206 and ADSC 208 and may offload data from the vehicle 204 to cloud storage 210 using offloaders 212, which may include one or more of cellular connections, Wi-Fi connections, and disks. Offloaded data may be uploaded from offloaders 210 to cloud storage 212 either manually (e.g., in the case of disks) or automatically (e.g., in the case of cellular and Wi-Fi).

Figure 3:
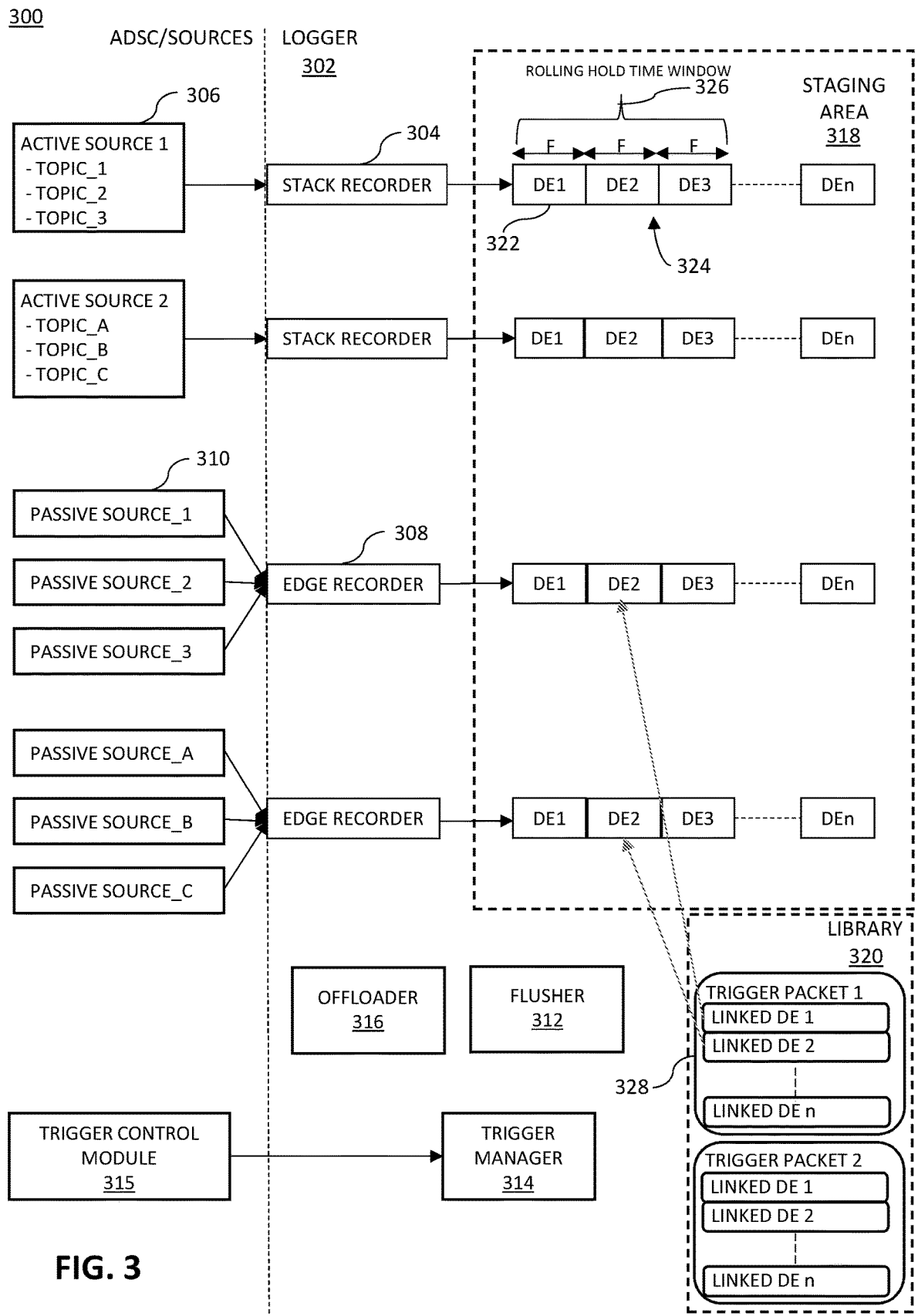
FIG. 3 illustrates a more detailed schematic block diagram of a VNLS, according to some aspects of the disclosed technology.

FIG. 3 is a more detailed schematic illustration of a VNLS 300 in accordance with features of embodiments described herein. As shown in FIG. 3, and as noted above, logger 302 may include stack recorders 304 for receiving data from active data sources 306 and edge recorders 308 for receiving data from passive data sources 310. Active data sources, or simply active sources, may include sources that are aware of the existence of the logger and package data specifically for processing by the logger. Recorder nodes on the ADSC are examples of active sources. Passive data sources, or simply passive sources, may include devices such as sensors that are unaware of the existence of logger 302. Edge recorders 308 listen to the data streams from passive sources 310 and package them accordingly.

In particular embodiments, logger 302 may run four modules, including recorders 304, 306, a flusher 312, a trigger manager 314 (which manages triggers on the logger side in response to triggers from a trigger control module 315 of ADSC), and an offloader 316. Additionally, logger 302 may include data storage generally comprising a staging area 318 and a library 320. Staging area may be implemented using RAM, hybrid RAM, or persistent memory (e.g., a solid-state drive (SSD)). Library may be implemented using SSD. Each recorder 304, 308, may be a server that listens to and accepts data to be logged to a corresponding logstream in a single folder. Recorders may be one of two primary types, including stack recorders 304 and edge recorders 308. Stack recorders may listen to data from active data sources 306, which may be driver nodes on the ADSC that transmit data from a stack launch to the logger. One stack recorder 304 may only listen to data from one active data source 306 and each active data source may include multiple topics. Edge recorders 308 may listen to passive data sources 310 and may have more responsibility for understanding traits of the passive sources and possibly parsing the data to weed out invalid data. One edge recorder 308 can listen to multiple passive sources 310. Edge recorders 308 can optionally record data from passive sources 310 even when the AV stack is not running by enabling a designated parameter in the edge recorder configuration.

In particular embodiments, every active data source 306 registers itself with the logger 302 prior to sending data. When an active data source 306 registers itself, the logger 302 may spawn a stack recorder 304 for the active data source. For passive data sources 310, the corresponding edge recorders 308 may be created during startup from parsing the relevant configuration files.

Active data sources 306 may package data into records, which may be transmitted to the logger 302. An active source 306 can begin streaming to an already initialized logger 302 by registering itself as a client. To register itself as a client, the active source 306 may need to specify the set of topics it will transmit. The logger 302 may prepare a staging area 318 for the active source 306.

Passive data sources 308 are edge devices. The logger 302 (and more specifically edge recorder 308) is responsible for transforming data from passive sources into a form appropriate for logging. Sensors, such as cameras, LIDARs, and RADARs are examples of passive sources. Data from multiple passive sources 310 may be gathered by edge recorders 308 following configuration information provided during initialization. Data from each passive source 310 may be labeled under a topic; topic names and passive sources may have a one-to-one mapping. An edge device that meets certain criteria can become a passive source 310 for the logger 302. Such criteria may include having a concept of a payload unit comprising a discrete unit of information with a start, an end, and a single timestamp associated with it (e.g., a jpeg frame, an H.265 P frame or I frame, or a LIDAR point cloud frame). Additionally, for sources for which the edge recorder performs data parsing, frames should arrive with a retrievable time stamp representing frame capture time. Finally, a source address: port should always map to one unique data source.

The staging area 318, or simply staging, is conceptually the primary data holding zone for the logger 302. Two modules may modify the contents of the staging area, including the recorders 304, 308, and the flusher 314. As noted above, the role of the recorders 304, 308, is to accept data from various active and passive sources 306, 310, and write data to slices, or data elements, 322 comprising a rolling buffer, alternatively referred to as logstream 324. Each recorder may be allocated a single logstream. A slice, or data element, may be a file on persistent media (such as an SSD), a RAM buffer, or a combination of both. The role of the flusher 312 is to delete data elements 322 that are outside of a rolling hold time window 326 and that have not been saved to the library 320. It will be noted that in particular implementations, the flusher function 312 may be incorporated into the recorders 304, 308.

A logstream, such as logstream 324, may be a series of data elements 322 in which each element includes time-stamped data received from one or more sources over a fixed time period F. In particular embodiments, each element will not have any data received prior to the timestamp in the name of the element or after the timestamp in the element+F. It will be noted that the creation of the data may have occurred prior to the timestamp, but receipt of the data will not have occurred prior to the timestamp. For example, in the case of camera data, the image might have been captured by the camera prior to the timestamp, but the image would have been received by the logger only after the timestamp.

Referring again to FIG. 3, the library 320 is a database that may hold snapshots, or trigger packets 328, related to the various triggers. A snapshot 328 may be created whenever the logger 202 receives an event (e.g., at the trigger manager 314) related to a previously registered trigger. As described in greater detail below, the trigger system, which includes trigger control module 315 and trigger manager 314, may generate snapshots 328 to be stored in the library.

The trigger system may enable a user to indicate that a certain set of data (i.e., data from a certain set of topics) is of interest and needs to be saved around the time of an incident (referred to as an event). The logger 302 may be a client of the trigger system and triggers may be registered with the logger for it to map the triggers to its data elements and folders, which mapping is performed by the trigger manager 314. When an event related to a trigger occurs, a notification may be sent from the trigger control module 315 to the logger 302 to cause the generation of a snapshot 328 related to the event, as described above.

Trigger registration can occur at any point during execution of the logger 302. It will be noted that if there are multiple loggers in a vehicle, duplicate versions of the trigger may be registered at each logger with the respective set of topics that each logger will receive. In this situation, a backend server may receive multiple snapshots related to the same event, which will need to be collated. Upon receiving a trigger registration, the logger 302 may create a mapping of the trigger to the logstreams 324 that include data related to the trigger. Note that since logstreams 324 are mapped to data sources 306, 310, that could publish multiple topics, a data element 322 of a logstream 324 might contain multiple topics, of which only a subset pertains to the trigger. This can be addressed during offload and/or by grouping topics appropriately. The sum of lookahead and lookbehind times ($T_W$) forms a rolling hold time window 326 for the trigger. The longest rolling hold time window for all triggers interested in (registered to) a logstream 324 may be designated as rolling hold parameter for use by the flusher 312 to delete data elements 322 not referenced by a trigger packet 328.

After a trigger ID has been registered, at any point a client can send a trigger event notification that includes a trigger ID and an event timestamp. Upon receiving an event, the logger 302 may create a snapshot 328 save it to the library 320. A snapshot is a database entry that may include a trigger ID, trigger priority, event timestamp, and on-disk data size of the snapshot.

A data element may be linked to by a snapshot in the library when an event has occurred for one or more triggers that are interested in that logstream where rolling hold time window of the trigger overlaps with the rolling hold time window of the data element and the snapshot has not yet been offloaded (or if the trigger has a preserve_post_offload flag set).

A data element can be linked to multiple times (e.g., by multiples snapshots) for various reasons. For example, different triggers that are interested in the same logstream have events within each other's rolling hold time window and/or two events occurred for the same trigger whose rolling hold time windows overlap. All links to a data element by snapshots in the library must be deleted before the data element can become a candidate for deletion. Additionally, except in a standalone mode, in cases in which the ADSC stops functioning for any reason, the flusher may cease deleting data elements to ensure that crucial data, such as collision-related data, does not get erased in case of an incident that destroys the ADSC but not the associated logger.

Data offload is the process of moving logged data off of the disk drives comprising the library to cloud storage, for example. In particular embodiments, and referring again to FIG. 3, the offloader 316, or offload module, provides an API to the external world to offload saved event snapshots. The offload module may operate regardless of whether the ADSC is active or whether a stack launch is operational. The offload module will have the capability to offload data elements related to multiple launches, so it is not necessary to have completed offload of a particular launch's data before starting the next one.

Example System for Performing Selective Offloading

In certain embodiments, there are three offload methods for data elements: during a drive (which implies that the ADSC is running), when the vehicle is disabled (e.g., post-collision or post-impoundment) and is not expected to be able to get to a fleet operator facility in the near term, and while the vehicle is at a fleet operator facility (which covers all standard data offload, including wired, wireless, or manual).

Figure 4:
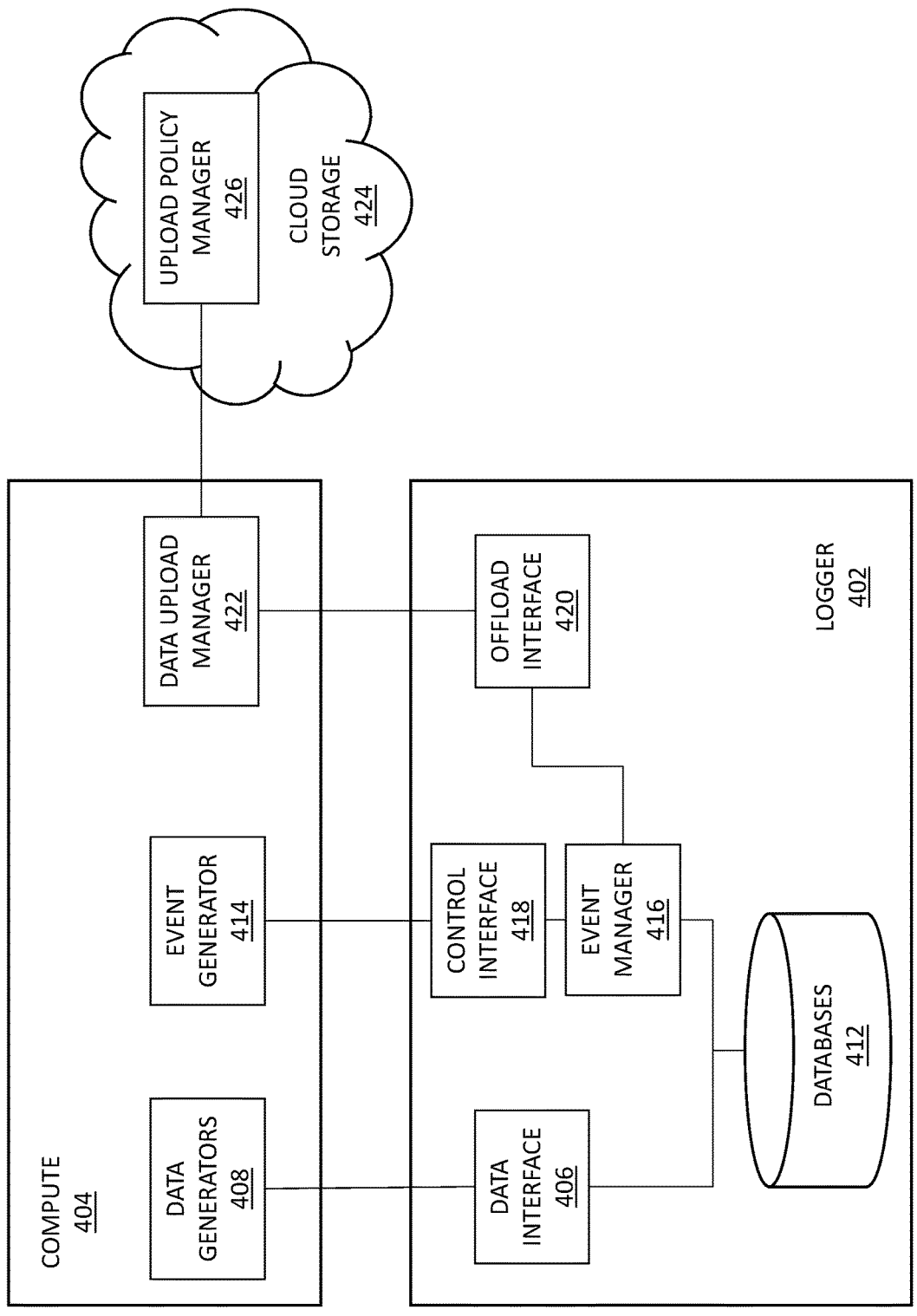
FIG. 4 illustrates a simplified block diagram of a system for performing selective offloading in connection with a VNLS, according to some aspects of the disclosed technology.

FIG. 4 illustrates a simplified diagram of a system 400 for performing selective offloading in a VNLS in accordance with features of particular embodiments. As shown in FIG. 4, system 400 includes a logger 402, which may be similar in relevant respects to logger 202 (FIG. 2), and a compute node 404, which may be similar in relevant respects to ADSC 208 (FIG. 2). Logger 402 and compute node 404 may be installed on a vehicle, such as AV 102 (FIG. 1). Logger 402 includes a data interface 406 that receives data from data generators 408 of compute node 404, which data is selectively logged to database 412 in accordance with events from event generators 414 and provided to event manager 416 via a control interface 418. In particular embodiments, logger 402 implements selective logging of data as described in detail above such that snapshots associated with events are stored in database 412. As also described above, metadata associated with snapshots may also be stored and serves as a tagging mechanism for snapshots. In particular, metadata may indicate a data tier of data comprising the snapshot.

Logger 402 further includes an offload interface 420 for interfacing with a data upload manager 422 of compute node 404 to selectively offload data (or snapshots) from database 412 to cloud storage 424 under the control of on demand offload manager 426. In particular embodiments, one or more of the offload interface 420, data upload manager 422, and upload policy manager 426 may be referred to individually and/or collectively as a selective offload system.

In particular embodiments, data upload manager 422 is responsible for transferring the snapshot data from logger 402 to the cloud storage 424 based on the data tier of the data as implemented by upload policy manager 426. Offload interface 420 is the API between logger 402 and data upload manager 422. Upload policy manager 426 may be responsible for interfacing with a centralized backend to receive reclassification requests for various snapshots (either the individual or bulk offload requests) and reclassify snapshots on logger 402 for data upload manager 422 to upload.

Example System for Data Classification Using Data Tiers

In accordance with features of embodiments described herein, a data classification system may be included in a VNLS, such as that described above, for supporting assignment of different service attributes for different data types, allowing for logging of both mandatory sets of data as well as non-mandatory sets of data that may be recorded opportunistically, thereby reducing the data footprint on the vehicle and on the cloud and reducing network and storage costs. In particular, data tiers enable data to be classified such it may be stored, or logged, opportunistically. Such data tiers also allow assignment of different service attributes to each tier of data that would assume the guaranteed logging, retention, and timely availability of mandated data while allowing for other data tiers to be recorded and offloaded opportunistically without affecting the mandated data set. Two new logging primitives may be added to implement the aforementioned data classification. These primitives include the addition of a new field or parameter (i.e., Data Tier) to the existing trigger config and the ability to change the Data Tier and priority of event snapshots post-creation.

As described above, commercial logging systems employ the concept of triggers and events to log relevant data during a drive. Historically, events may have been categorized into a priority hierarchy using two fields, including offload_mode (e.g., cellular, Wi-Fi) and trigger_priority (e.g., levels 8 through 1). In accordance with features of embodiments described herein, those two fields are replaced in the trigger config by the aforementioned Data Tier field.

Table 1 below sets forth a summary of example data tiers values that may be deployed in an example system.

TABLE 1

| Data Tier | CRITICAL/URGENT | NECESSARY [HI/LO] | BEST EFFORT [HI/LO] | STANDBY-HI | STANDBY-LO |
|---|---|---|---|---|---|
| Function | Offload immediately over cellular. Should not be deleted without offloading. | Offload over wired/Wi-Fi. Should not be deleted without offloading. | Queued for offload behind NECESSARY unless deleted. | Intended for use by in-vehicle client. Not for cloud offload. | Similar to STANDBY-HI but deleted on disk full. |
| Offload Policy | Offload immediately | Offload after CRITICAL/URGENT | Offload after NECESSARY (unless deleted) | Never offload to cloud | Never offload to cloud |

TABLE 1-continued

| Data Tier | CRITICAL/URGENT | NECESSARY [HI/LO] | BEST EFFORT [HI/LO] | STANDBY-HI | STANBY-LO |
|---|---|---|---|---|---|
| Delete on Offload to Cloud? | Yes | Yes | Yes | No (delete on request from in vehicle offline processing (IVOP) client) | No (delete on request from IVOP client) |
| Delete on Disk Full? | No | No | Yes | No | Yes |
| Has On-Vehicle Retention Policy? | No | No | Yes | Yes | Yes |
| Use | Events with SLA <1 day | Events that must be logged and retained for all drives | Active data campaigns, R&D data, diagnostics | Data to be processed in-vehicle, inactive data campaigns | Same as STANDBY-HI but is strictly "nice to have" |
| Offload Mode | Cellular | Wired/Wi-Fi | Wired/Wi-Fi | N/A | N/A |
| Examples | Collision review, map changes | Confirmed VRE and most events currently logged | Unconfirmed VREs, other R&D events | Mandatory OOD snapshots, CCR | Lower priority OOD events |

As may be noted from Table 1, the data tier to which an event (and/or data associated with an event) is assigned may be used to specify whether such data is to be logged, as well as the retention and offload policies associated with the data. Events and/or data associated with events may be promoted and/or demoted to different data tiers to accomplish various business, technological, or other purposes or goals as desired. Additionally, events and/or data associated with events may be promoted and/or demoted to different data tiers based on what is detected/perceived by the AV sensors. Moreover, triggers, or campaigns, may be defined to capture specific objects/events or types of objects/events, as described in greater detail below.

A commercial VNLS may be required to provide for a variety of special logging situations, such as tentative events (TTE), offload on demand (OOD), and dynamic data campaigns (DDC). TTEs may be events from low-fidelity triggers, where the triggering signals do not definitively indicate that an event associated with the trigger has occurred. On the contrary, whether the event has in fact occurred can only be verified at a later point in time, at which point the snapshot, or data, for the event should be logged. Examples of TTEs may include vehicle recovery events (VREs), calibration failures, rider "app shakes," etc. OOD is based on the assumption that many events that are captured are not needed for most drives of most vehicles; therefore, offloading and storing such events on the cloud unnecessarily increases offload and storage costs. OOD enables snapshots pertaining to certain events to be left on the vehicle for a defined retention period, only to be offloaded upon request, or demand. DDC refers to the addition or subtraction of triggers dynamically via a central cloud-based source for vehicles deployed in the field. Subtractive DDC may refer to the act of downloading to vehicles a filter to remove a set of events from being logged or offloaded. Additive DDC may refers to downloading of new triggers such that events for those triggers are logged and offloaded.

As noted above, in accordance with features of embodiments described herein, the Data Tier field may be implemented as part of the trigger config and may establish the default tier for any event created for that trigger; however, the tier can be changed post creation (e.g., to enable data stored in the STANDBY tiers to be offloaded). All events of a particular trigger may initially be saved on the vehicle at the data tier noted in the trigger config and the logger may provide a feature to promote or demote the data tier of an event post-creation.

TTE handling (which may include VRE Diagnosis Logging) may be necessary due to the excessive event generation caused by low-fidelity triggers. Statistically, an event generated by a low-fidelity trigger may have a roughly 99% false positive rate and logging all such events will increase the logging footprint by approximately 50%. As will be described in greater detail below, in particular embodiments, snapshots may be created in a new pending state on the logger, which may be promoted or deleted on confirmation or cancellation via a design to handle TTEs. In particular, there are three signals of note with respect to such events generated by low-fidelity triggers, including MAYBE VRE, which indicates that the vehicle is stuck and could result in a VRE, CONFIRMED VRE, which indicates that the vehicle is definitely in a VRE situation, or CANCELED VRE (or NOT VRE), which indicates that the vehicle was able to resolve the issue and is able to proceed. Using the data tiers described hereinabove, a MAYBE VRE signal associated with an event may be addressed by logging a snapshot for the event in the BEST EFFORT data tier, which snapshot could get offloaded even if not confirmed or could get deleted if the disk gets full. A CONFIRMED VRE signal may be addressed by promoting the snapshot with which the signal is associated to NECESSARY, such that the snapshot will be offloaded as per the standard offload policy. A CANCELED VRE (or NOT VRE) signal may be addressed by doing nothing, in which case the data comprising the snapshot might get offloaded or might get deleted if the disk gets full. The foregoing solution maintains state in that it stores the event_id that can be confirmed or promoted as described above.

With regard to providing OOD capabilities, in which data logged during the drive is only offloaded if there is an external request from the backend to retrieve it (e.g., retrieve all events for trigger X that occurred between time T1 and time T2 on vehicle V), such events may be logged to one of data tiers STANDBY-HI or STANDBY-LO; which one of the two tiers is selected may be based on the business need. For example, STANDBY-LO data could get deleted any time the disk gets full, while STANDBY-HI data will remain on the disk until the on-vehicle retention period for the type of event expires. When any event from this data tier is requested to be offloaded, the relevant events may be promoted to an offloadable tier, such as BEST EFFORT or CRITICAL/URGENT. It should be noted that it may be advisable to limit writing OOD data at the STANDBY-HI tier, as data in that tier is not deletable on a disk full event.

In situations in which IVOP is applicable, such as in a continuous calibration refinement (CCR) use case in which logging of certain data is read back to the ADSC for processing by calibration nodes and is never intended to be uploaded, the data may be stored in the STANDBY-LO data tier such that the data may be read onto the vehicle for processing and then deleted.

With regard to DDC, in particular embodiments, signals from the cloud backend are sent to vehicles to log and offload certain topics and events for a certain period of time. Across an entire fleet, this means that only a subset of vehicles may be logging certain events at a certain time of day. There may be two axes of configuration in connection with DDC event logging, including launch-time vs. drive-time configuration (i.e., whether config changes to what is being logged can be performed when the vehicle is mid drive versus during stack launch) and additive vs. subtractive campaigns (i.e., whether a new campaign can request the addition of topic and triggers to be logged or request the filtering out of topics and triggers from being logged). Depending on implementation requirements, this could involve changes not just to the logging subsystem, but to the overall software stack as well. For example, the decision as to what topics are subscribed to by what nodes is a compile time, not a launch time or drive time, decision; therefore, additive campaigns may require changes to AV frameworks. On the other hand, certain subsets of DDC are made possible with the framework changes. For example, subtractive DDC is similar to OOD in that data would get logged but not offloaded if a lookback is desired for the DDC. It could also be implemented as a filter of which events are logged or not if only a lookahead is desired.

Figure 5:
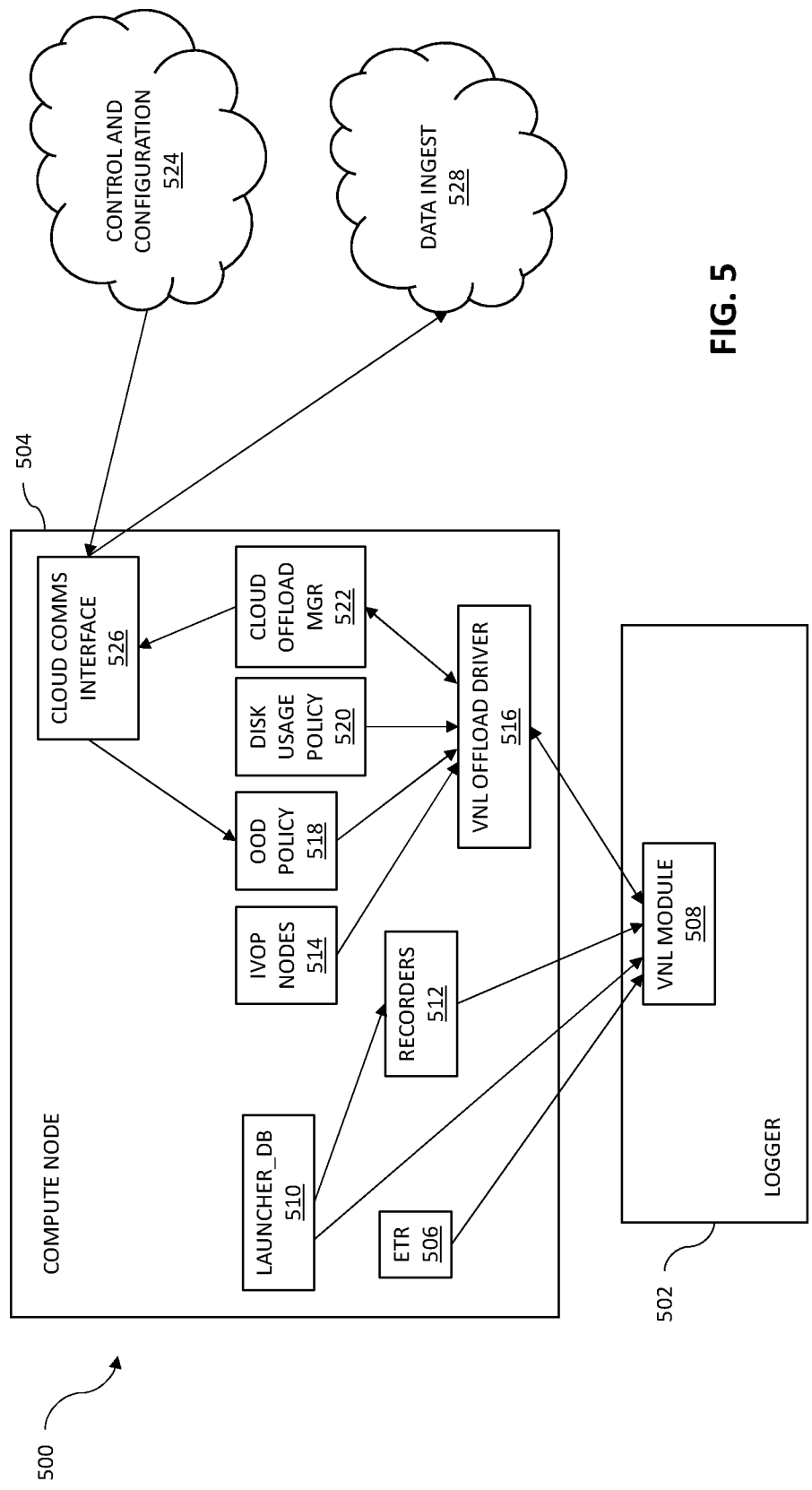
FIG. 5 illustrates a simplified block diagram of a system for implementing a data classification system in a VNLS, according to some aspects of the disclosed technology.

Referring now to FIG. 5, illustrated therein is a simplified diagram of a system 500 for implementing operations in connection with data tiers in a VNLS in accordance with features of particular embodiments. As shown in FIG. 5, system 500 includes a logger 502, which may be similar in relevant respects to logger 202 (FIG. 2) and/or logger 402 (FIG. 4), and a compute node 504, which may be similar in relevant respects to ADSC 208 (FIG. 2) and/or compute node 404 (FIG. 4). System 500 may be installed on a vehicle, such as AV 102 (FIG. 1). In particular embodiments, systems such as system 500 are installed on a fleet of AVs, such as AV 102.

As shown in FIG. 5, compute node 504 includes an event trigger router (ETR) 506 for notifying a VNL module 508 of logger 502 of the occurrence of events associated with triggers. Compute node 504 can further include a launcher_db module 510, which reads the data tier information from the trigger definition files for triggered events and forwards the data tier information to the VNL module 508. Compute node 504 also includes one or more IVOP nodes 514, which perform IVOP tasks such as retrieving and/or deleting recorded data via a VNL offload driver 516. In particular implementations, IVOP data may be used for continuous calibration refinement purposes, which involves the logging of particular data that is read back to the ADSC for processing by calibration nodes and which is not intended to be uploaded from the vehicle. It will be recognized that events intended for one or more IVOP nodes 514 may therefore advantageously logged in the STANDBY-LO data tier, read on to the vehicle for processing, and then deleted.

In accordance with features of embodiments described herein, compute node 504 additionally includes an OOD policy 518, a disk usage policy 520, and a cloud offload manager 522. OOD policy 518 promotes/demotes logged data/events among data tiers at VNL module 508 via the VNL offload driver 516. OOD policy 518 may be updated by control and configuration module 524 via cloud communications interface 526.

Disk usage policy 520 is provided for listening to a disk space free topic published by the VNL module 508 and, based on appropriate limits, deleting snapshots that are part of the appropriate tiers (e.g., tiers with a retention policy of "delete on disk full"). Cloud offload manager 522 is provided for offloading data by tier from VNL module 508 to data ingest 528 in accordance with the offload policy associated with the tier.

Example Techniques for Using Data Tiers in a VNLS

Figure 6A:
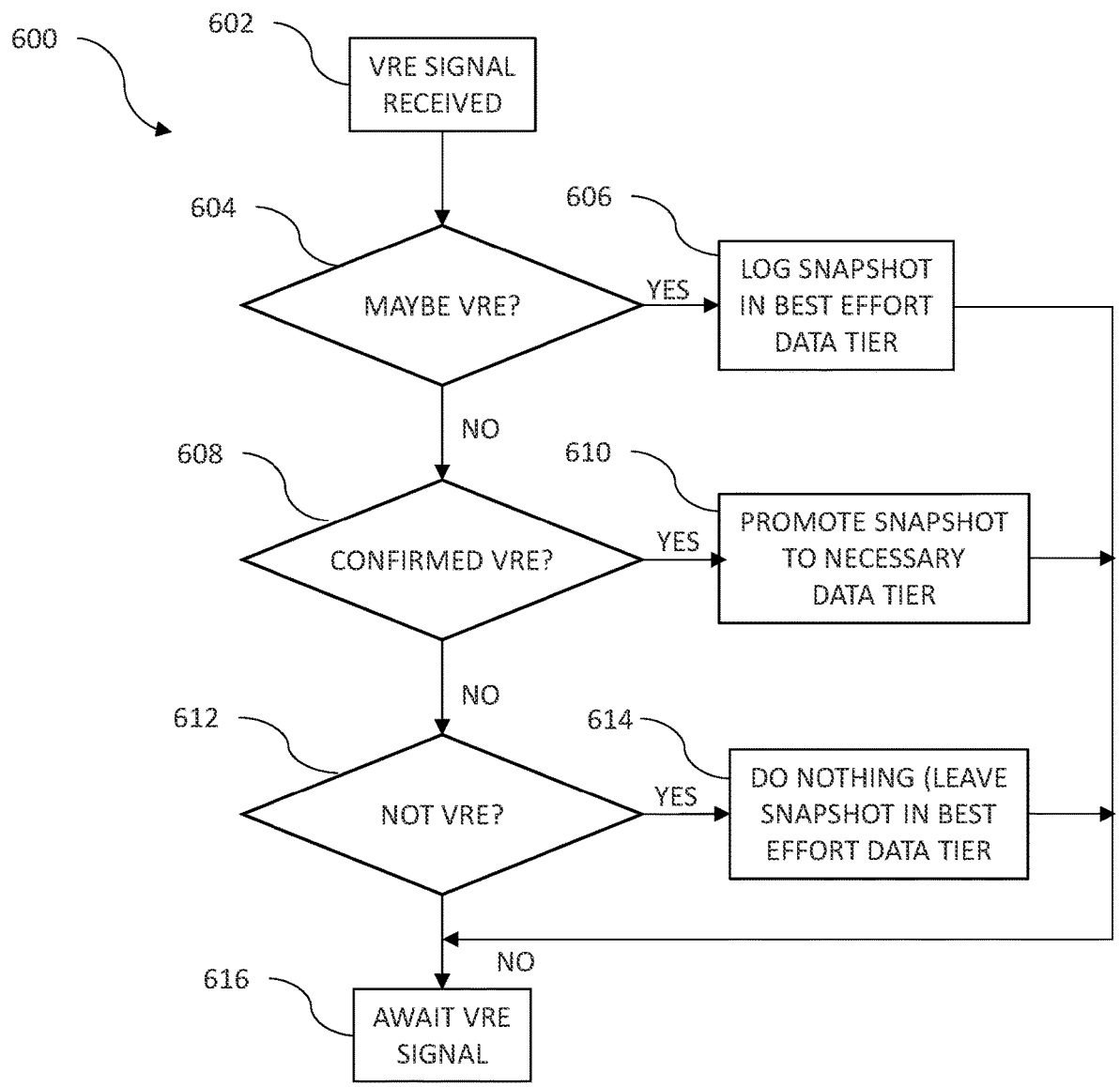
FIGS. 6A-6C illustrate flow diagrams of example operations of a variety of possible user cases for a data classification system in a VNLS, according to some aspects of the disclosed technology.

FIG. 6A is a flowchart 600 illustrating example operations for performing TTE handling in a VNLS using data tiers in accordance with embodiments described herein. In certain embodiments, one or more of the operations illustrated in FIG. 6A may be executed by one or more of the elements shown in FIGS. 1-5, for example.

In 602, a VRE signal is received. As previously noted, a VRE signal may be generated in connection with an event in associated with a low-fidelity VRE trigger.

In 604, a determination is made whether the received VRE signal is a MAYBE VRE signal, indicating that the vehicle is stuck and the situation could result in a VRE.

If a positive determination is made in 604, execution proceeds to 606, in which a snapshot is logged for the event in the BEST EFFORT data tier. As illustrated in TABLE 1, assigning the snapshot to the BEST EFFORT tier means that the snapshot could get offloaded even if not confirmed (below) or it could get deleted if the disk gets full before offload.

In 608, a determination is made whether the received VRE signal is a CONFIRMED VRE signal, which indicates that the vehicle is definitely in a VRE condition.

If a positive determination is made in 608, execution proceeds to 610, in which the event snapshot is promoted from the BEST EFFORT tier to the NECESSARY tier, such that it will be offloaded as per the standard offload policy.

In 612, a determination is made whether the VRE signal is a NOT VRE signal, which indicates that the vehicle is not in a VRE condition.

If a positive determination is made in 612, execution proceeds to 614, in which no action is taken (i.e., the snapshot remains in the BEST EFFORT tier).

In 616, the system awaits receipt of the next VRE signal.

It will be noted that operations of flowchart 600 may continue to be performed throughout a drive time of an AV and that offloading of logged data from the AV will be performed in accordance with offload policy.

Although the operations of the example method shown in and described with reference to FIG. 6A are illustrated as occurring once each and in a particular order, it will be recognized that the operations may be performed in any suitable order and repeated as desired. Additionally, one or more operations may be performed in parallel. Furthermore, the operations illustrated in FIG. 6A may be combined or may include more or fewer details than described.

Figure 6B:
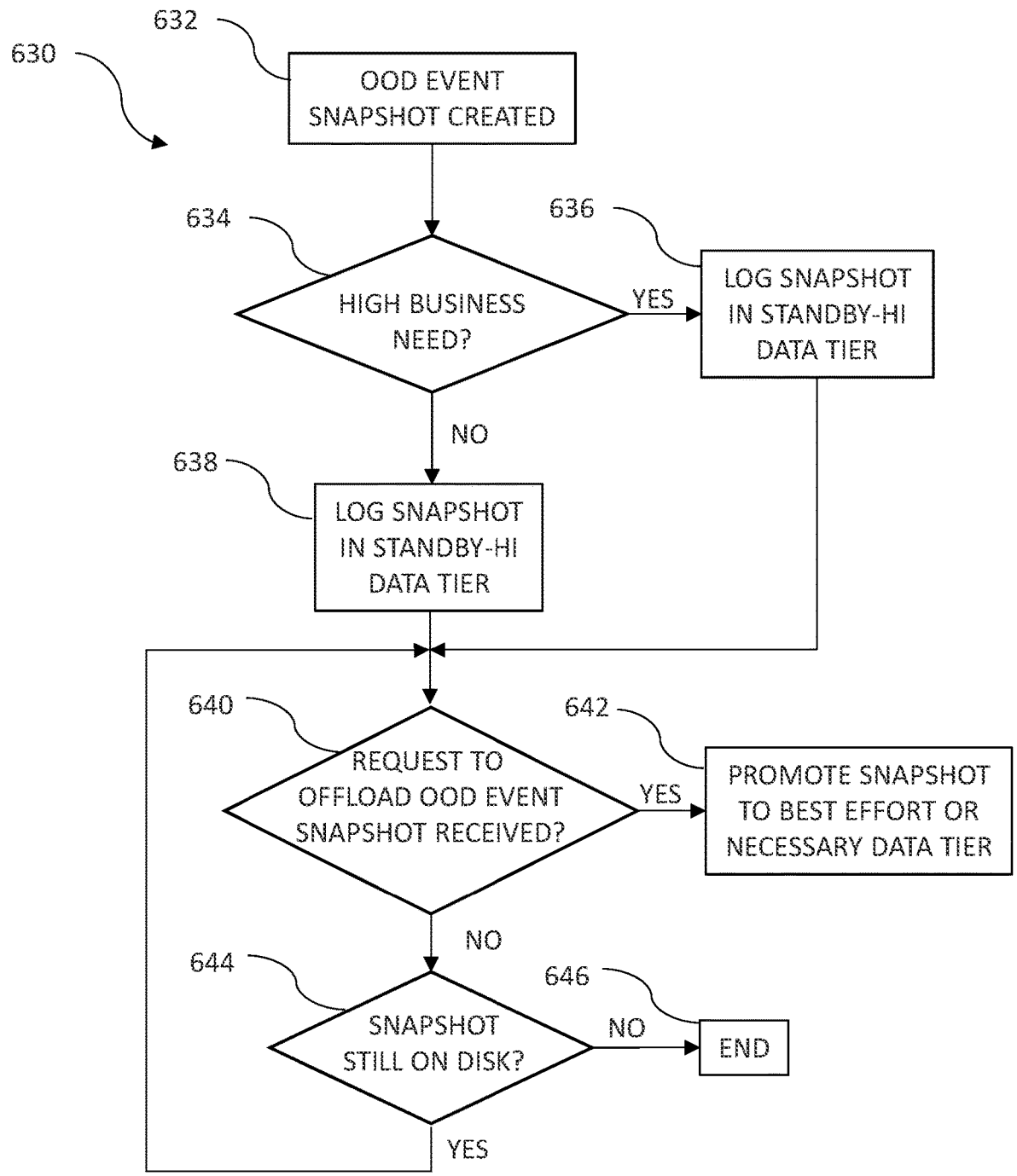

FIG. 6B is a flowchart 630 illustrating example operations for performing OOD in a VNLS using data tiers in accordance with embodiments described herein. In certain embodiments, one or more of the operations illustrated in FIG. 6B may be executed by one or more of the elements shown in FIGS. 1-5, for example.

In 632, creation of an OOD event snapshot is detected. As previously noted, OOD data is data that gets logged every drive, but is offloaded only if there is an external request from the backend to retrieve it.

In 634, a determination is made whether there is a high or important business (or other) need for the data. It will be recognized that this step may require a subjective analysis to be performed. Alternatively, there may be established metrics by which a it is determined that there is a high or important need for the data.

If a positive determination is made in 634, in 636, the snapshot is logged in the STANDBY-HI tier, meaning the data will not get deleted on disk full.

If a negative determination is made in 634, in 638, the snapshot is logged in the STANDBY-LO tier, meaning the data could be deleted any time the disk space starts to be limited.

In 640, a determination is made whether a request to offload the snapshot has been received.

If a positive determination is made in 640, in 642, the snapshot is promoted to an offloadable tier, such as BEST EFFORT or NECESSARY.

If a negative determination is made in 640, in 644, a determination is made whether the snapshot is still on the disk (i.e., has not been deleted, as may be the case if the snapshot was logged to the STANDBY-LO tier).

If a positive determination is made in 644, execution returns to 640.

If a negative determination is made in 644, operation terminates in 646.

It will be noted that operations of flowchart 630 may continue to be performed throughout a drive time of an AV and that offloading of logged data from the AV will be performed in accordance with offload policy.

Although the operations of the example method shown in and described with reference to FIG. 6B are illustrated as occurring once each and in a particular order, it will be recognized that the operations may be performed in any suitable order and repeated as desired. Additionally, one or more operations may be performed in parallel. Furthermore, the operations illustrated in FIG. 6B may be combined or may include more or fewer details than described.

Figure 6C:
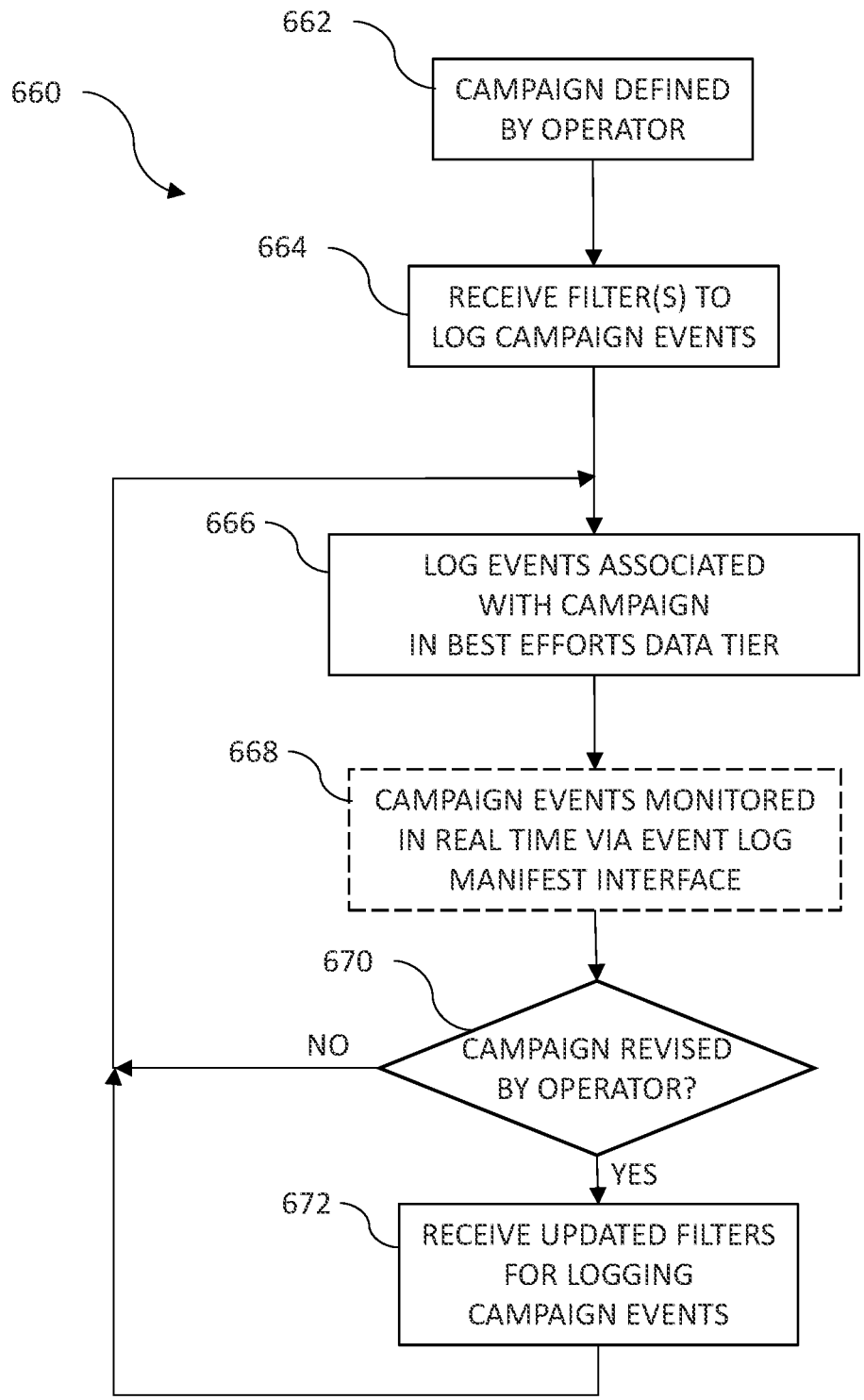

FIG. 6C is a flowchart 660 illustrating example operations for implementing DDC in a VNLS using data tiers in accordance with embodiments described herein. In certain embodiments, one or more of the operations illustrated in FIG. 6C may be executed by one or more of the elements shown in FIGS. 1-5, for example.

In 662, a campaign may be defined by an operator. The campaign may be defined via a user interface of control and configuration 524, for example. In accordance with features of embodiments described herein, the campaign may designate and/or define one or more events or types of events, one or more triggers or types of triggers, one or more time frames (including, for example, time(s) of day, days of the week, calendar date ranges, seasons, months, etc.), one or more locations, one or more subsets of an AV fleet, or any number of other characteristics for defining events for which data may be gathered by one or more AVs of a fleet of AVs. As noted above, filters may implement additive DDC, in which case triggers are added to the VNLS systems of AVs, or subtractive DDC, in which case triggers are removed from the VNLS systems of the AVs.

In 664, an AV receives one or more filters associated with the defined campaign to be used in logging events of the campaign. It will be recognized that the one or more filters may be provided to one or more AVs of a fleet of AVs controlled by the same fleet management system, for example.

In 666, events associated with the campaign (e.g., as defined by the filters) are logged by the AV in the BEST EFFORT tier. It will be recognized that the event data may be logged as BEST EFFORTS-HI or BEST EFFORT-LO and that distinctions may be made between the two tiers as useful or beneficial for implementing particular embodiments or furthering particular goals of the invention. It will noted that BEST EFFORT may be defined as the default tier for campaign data; however, events may be promoted based on other events (either events that happened previously or events that happen later). In this regard, vehicles may be capable of promoting events.

In optional 668, logging of campaign events (e.g., the progress of the campaign) may be viewed in real time or substantially real time via an event log manifest interface, which may be provided by control and configuration 524. It will be recognized that the event log manifest may provide a window into events logged for the campaign on a per-AV basis, for example, and may be sortable and filterable in various embodiments, As such, the event log manifest may enable an operator to monitor the progress of the campaign and make changes as desired (e.g., to increase or decrease the amount and/or type of event data being logged across the AV fleet).

In 670, a determination is made whether the campaign has been revised (e.g., in response to the monitoring in 668).

If a negative determination is made in 670, execution returns to 666.

If a positive determination is made in 670, in 672, updated filters are received for logging campaign events, after which execution returns to 666.

It will be noted that operations of flowchart 660 may continue to be performed throughout a drive time of an AV and that offloading of logged data from the AV will be performed in accordance with offload policy.

Although the operations of the example method shown in and described with reference to FIG. 6C are illustrated-0 as occurring once each and in a particular order, it will be recognized that the operations may be performed in any suitable order and repeated as desired. Additionally, one or more operations may be performed in parallel. Furthermore, the operations illustrated in FIG. 6C may be combined or may include more or fewer details than described.

Example Processor-Based System

Figure 7:
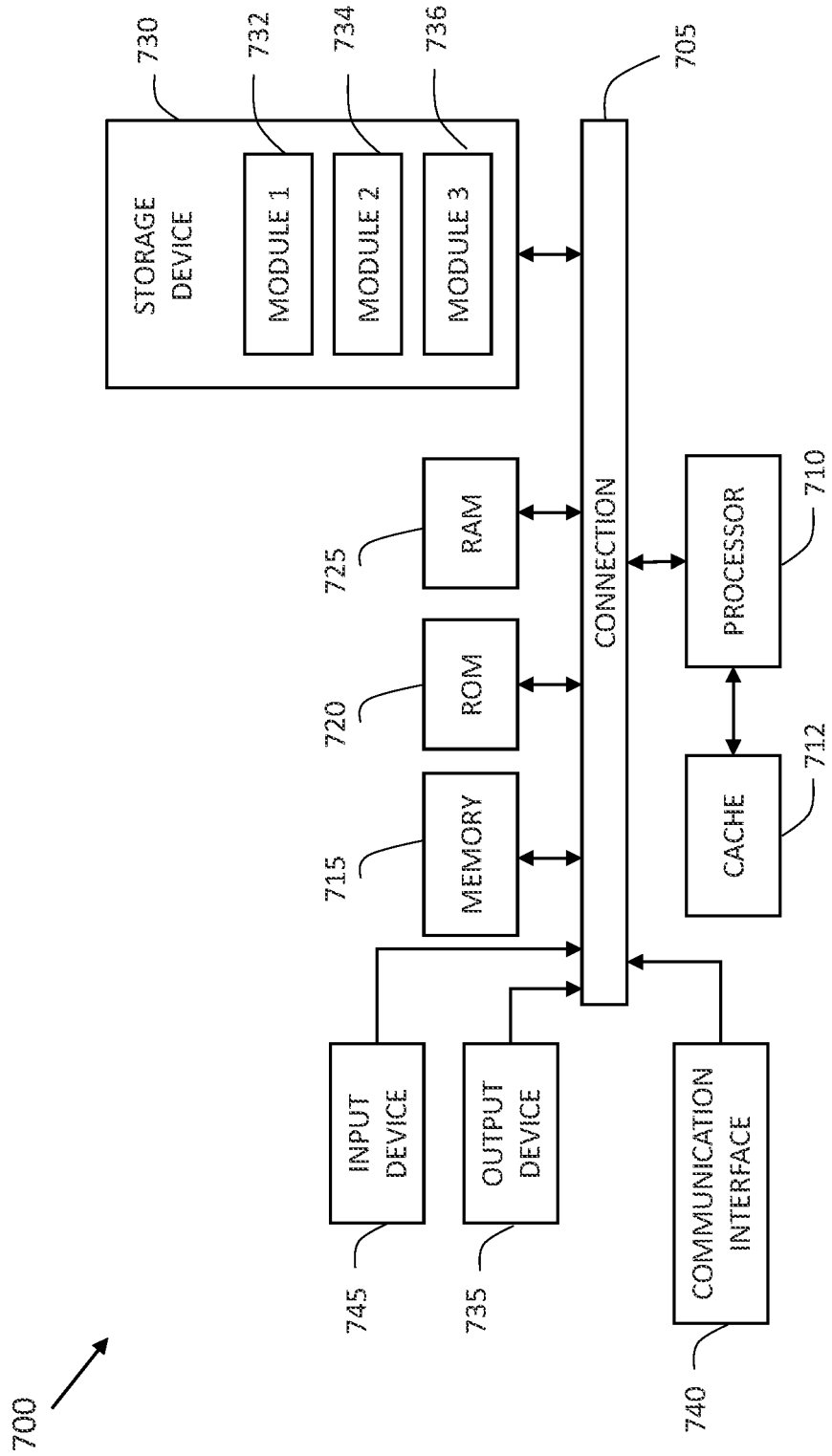
FIG. 7 illustrates an example processor-based system with which some aspects of the disclosed technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special purpose processor where software instructions are incorporated into the actual processor design. One or more of services 732, 734, and 736 may be involved in implementing one or more operations shown and described above. For example, one or more of services 732 may be involved in implementing operations of one or more of flowcharts 600, 630, 660, and/or one or more of the elements shown as comprising compute node 504. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 1045, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 1040, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a Bluetooth® wireless signal transfer, a Bluetooth® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 1040 may also include one or more GNSS receivers or transceivers that are used to determine a location of the computing system 700 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a Compact Disc Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides a computer-implemented method for logging events in a vehicle network logging system (VNLS) of an autonomous vehicle (AV), the method comprising subsequent to occurrence of an event, identifying a data tier for the event, the identified data tier selected from a plurality of data tiers of the VNLS and defined by a trigger corresponding to the event; and logging the event to a storage device of the VNLS in the identified data tier, wherein the identified data tier specifies an offload policy and a deletion policy for the event.

Example 2A provides the computer-implemented method of example 1, wherein the event comprises a first event and the computer-implemented method further comprises moving the first event from the identified data tier to another data tier based on occurrence of a second event associated with the operation of the AV.

Example 2B provides the computer-implemented method of any of examples 1-2A, wherein the offload policy identifies an offload method, the offload method selected from a group consisting of Wi-Fi connection, wired network connection, and cellular network connection.

Example 3 provides the computer-implemented method of any of examples 1-2B, wherein the offload policy identifies an offload priority indicating when and whether to offload the event to a cloud service.

Example 4 provides the computer-implemented method of any of examples 1-3, wherein the identified data tier further specifies an on-vehicle retention period for the event.

Example 5 provides the computer-implemented method of any of examples 1-4, wherein the deletion policy identifies whether to delete the event from the storage device of the VNLS upon offload of the event to a cloud service and whether to delete the event from the storage device of the VNLS upon a determination that the storage device is full.

Example 6 provides the computer-implemented method of any of examples 1-5, wherein the storage device comprises a solid state disk (SSD).

Example 7 provides the computer-implemented method of any of examples 1-6, wherein the plurality of data tiers are prioritized with respect to one another.

Example 8 provides the computer-implemented method of any of examples 1-7, further comprising offloading all of a plurality of events logged to the storage device in the identified data tier in accordance with the offload policy of the identified data tier.

Example 9 provides a vehicle network logging system (VNLS) comprising a logger for storing data associated with events, wherein for each of the events, the associated data is created when a trigger associated with the event is received at the VNLS; and a compute node for, for each of the events, subsequent to occurrence of creation of data associated with the event, identifying a data tier for the event, the identified data tier selected from a plurality of data tiers of the VNLS and defined by the trigger associated with the event; and logging the data for the event to an internal disk of the VNLS in the identified data tier, wherein the identified data tier specifies an offload policy and a deletion policy for the data.

Example 10 provides the VNLS of example 9, wherein the offload policy identifies an offload method for the data selected from a group consisting of Wi-Fi connection, wired network connection, and cellular network connection; and an offload priority indicating when and whether to offload the data to a cloud service.

Example 11 provides the VNLS of any of examples 9-10, wherein the identified data tier further specifies a length of time to retain the data on the internal disk of the VNLS before deletion.

Example 12 provides the VNLS of any of examples 9-11, wherein the deletion policy identifies whether to delete the data from the internal disk of the VNLS upon offload of the data to a cloud service and whether to delete the data from the internal disk of the VNLS upon a determination that a remaining storage capacity of the internal disk has fallen below a predetermined threshold.

Example 13 provides the VNLS of any of examples 9-12, wherein the plurality of data tiers are prioritized relative to one another such that data logged in a first one of the data tiers is offloaded prior to data logged in a second one of the plurality of data tiers.

Example 14 provides the VNLS of any of examples 9-13, further comprising offloading all of the data logged in the in the identified data tier in accordance with the offload policy of the identified data tier.

Example 15 provides the VNLS of any of examples 9-14, wherein the compute node comprises an automated driving system computer (ADSC).

Example 16 provides one or more non-transitory computer-readable storage media comprising instructions for execution that, when executed by a processor, are operable to cause to be performed operations comprising receiving by a vehicle network logging system (VNLS) installed on a vehicle at least one filter in connection with campaign initiated by an operator using a cloud service, wherein the campaign defines parameters associated with the campaign; and logging events that meet the defined parameters associated with the campaign to a storage device of the VNLS in a particular data tier comprising one of a plurality of data tiers defined for the VNLS, wherein the operator is able to monitor the logging events in substantially real time; wherein particular data tier specifies an offload method comprising one of a wired connection and a Wi-Fi connection and the deletion policy that requires events logged in the particular data tier to be deleted when a remaining storage capacity of the storage device has fallen below a predetermined threshold.

Example 17 provides the one or more non-transitory computer-readable storage media of example 16, wherein the operations further comprise promoting at least one of the events from the particular data tier to a higher priority one of the data tiers.

Example 18 provides the one or more non-transitory computer-readable storage media of example 17, wherein the promoting is initiated by one of the VNLS and the operator.

Example 19 provides the one or more non-transitory computer-readable storage media of any of examples 16-18, wherein the operations further comprise receiving by the VNLS at least one updated filter in connection with the campaign.

Example 20 provides the one or more non-transitory computer-readable storage media of any of examples 16-19, wherein the parameters comprise at least one of a time, a time range, a date, a date range, a time of day, an event type, a trigger ID, or a geographic location.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A computer-implemented method for logging events in a vehicle network logging system (VNLS) of an autonomous vehicle (AV), the method comprising:
performing, using a processor, event logging operations and event tier management operations;
wherein performing the event tier management operations comprises:
receiving, using recorders of a logger in the VNLS, data representing a vehicle event, the data comprising information relevant to an occurrence of the vehicle event;
using a trigger control module to generate, based at least in part on the data, a trigger event notification, the trigger event notification including event metadata;
using a trigger manager of the logger in the VNLS to identify, based at least in part on the trigger event notification, a data tier for the vehicle event, the identified data tier being selected from a plurality of data tiers of the VNLS and defined by the event metadata;
creating, by the trigger manager, a snapshot associated with the vehicle event, the snapshot comprising the event metadata and references to data elements associated with the vehicle event; and
storing, by the trigger manager, the snapshot as a record in a library of the VNLS, the library enabling management, lookup, and coordination of data retention, offload, and deletion policies, and serving as a control structure for tracking associations between data elements, events, and triggers;
wherein performing the event logging operations comprise using recorders of the logger to store, in a storage device of the VNLS and in the identified data tier, the data associated with the vehicle event; and
wherein the identified data tier determines a retention period, offload conditions, and a deletion policy for the data associated with the vehicle event stored in the storage device of the VNLS and in the identified data tier.

2. The computer-implemented method of claim 1, wherein the vehicle event comprises a first event and the tier management operations further comprise moving the first event from the identified data tier to another data tier based on occurrence of a second event associated with the operation of the AV.

3. The computer-implemented method of claim 1, wherein the identified data tier specifies an offload method, the offload method selected from a group consisting of Wi-Fi connection, wired network connection, and cellular network connection.

4. The computer-implemented method of claim 1, wherein the identified data tier further specifies an offload priority indicating when and whether to offload the data associated with the vehicle event to a cloud service.

5. The computer-implemented method of claim 1, wherein the identified data tier further specifies an on-vehicle retention period for the data associated with the vehicle event.

6. The computer-implemented method of claim 1, wherein the identified data tier specifies a deletion policy that identifies whether to delete the data associated with the vehicle event from the storage device of the VNLS upon offload of the data to a cloud service and whether to delete the data from the storage device of the VNLS upon a determination that the storage device is full.

7. The computer-implemented method of claim 1, wherein the plurality of data tiers are prioritized with respect to one another.

8. The computer-implemented method of claim 1, wherein the tier management operations further comprise offloading all of a plurality of data associated with vehicle events logged to the storage device in the identified data tier in accordance with the offload policy of the identified data tier.

9. A vehicle network logging system (VNLS) comprising a processor configured to perform processor operations comprising:
performing, using a processor, event logging operations and event tier management operations;
wherein performing the event tier management operations comprises:
receiving, using recorders of a logger in the VNLS, data representing a vehicle event, the data comprising information relevant to an occurrence of the vehicle event;
using a trigger control module to generate, based at least in part on the data, a trigger event notification, the trigger event notification including event metadata;
using a trigger manager of the logger in the VNLS to identify, based at least in part on the trigger event notification, a data tier for the vehicle event, the identified data tier being selected from a plurality of data tiers of the VNLS and defined by the event metadata;
creating, by the trigger manager, a snapshot associated with the vehicle event, the snapshot comprising the event metadata and references to data elements associated with the vehicle event; and
storing, by the trigger manager, the snapshot as a record in a library of the VNLS, the library enabling management, lookup, and coordination of data retention, offload, and deletion policies, and serving as a control structure for tracking associations between data elements, events, and triggers;
wherein performing the event logging operations comprise using recorders of the logger to store, in a storage device of the VNLS and in the identified data tier, the data associated with the vehicle event; and
wherein the identified data tier determines a retention period, offload policy, and a deletion policy for the data associated with the vehicle event stored in the storage device of the VNLS and in the identified data tier.

10. The VNLS of claim 9, wherein the identified data tier specifies:
an offload method for the data associated with the vehicle event selected from a group consisting of Wi-Fi connection, wired network connection, and cellular network connection; and
an offload priority indicating when and whether to offload the data associated with the vehicle event to a cloud service.

11. The VNLS of claim 9, wherein the identified data tier further specifies a length of time to retain the data associated with the vehicle event on the storage device of the VNLS before deletion.

12. The VNLS of claim 9, wherein the identified data tier specifies a deletion policy identifies whether to delete the data associated with the vehicle event from the storage device of the VNLS upon offload of the data to a cloud service and whether to delete the data from the storage device of the VNLS upon a determination that a remaining storage capacity of the storage device has fallen below a predetermined threshold.

13. The VNLS of claim 9, wherein the plurality of data tiers are prioritized relative to one another such that data associated with a vehicle event logged in a first one of the data tiers is offloaded prior to data associated with a vehicle event logged in a second one of the plurality of data tiers.

14. The VNLS of claim 9, further comprising offloading all of the data associated with vehicle events logged in the identified data tier in accordance with the offload policy of the identified data tier.

15. The VNLS of claim 9, wherein the processor node comprises an automated driving system computer (ADSC).

16. One or more non-transitory computer-readable storage media comprising instructions for execution that, when executed by a processor, are operable to cause to be performed processor operations comprising:
  performing, using the processor, event logging operations and event tier management operations;
  wherein performing the event tier management operations comprises:
    receiving, using recorders of a logger in the VNLS, data representing a vehicle event, the data comprising information relevant to an occurrence of the vehicle event;
    using a trigger control module to generate, based at least in part on the data, a trigger event notification, the trigger event notification including event metadata;
    using a trigger manager of the logger in the VNLS to identify, based at least in part on the trigger event notification, a data tier for the vehicle event, the identified data tier being selected from a plurality of data tiers of the VNLS and defined by the event metadata;
    creating, by the trigger manager, a snapshot associated with the vehicle event, the snapshot comprising the event metadata and references to data elements associated with the vehicle event; and
    storing, by the trigger manager, the snapshot as a record in a library of the VNLS, the library enabling management, lookup, and coordination of data retention, offload, and deletion policies, and serving as a control structure for tracking associations between data elements, events, and triggers;
  wherein performing the event logging operations comprise using recorders of the logger to store, in a storage device of the VNLS and in the identified data tier, the data associated with the vehicle event; and
  wherein the identified data tier determines a retention period, offload conditions, and a deletion policy for the data associated with the vehicle event stored in the storage device of the VNLS and in the identified data tier.

17. The one or more non-transitory computer-readable storage media of claim 16, wherein the processor operations further comprise:
  promoting at least one of the snapshots associated with a vehicle event from the particular data tier to a higher priority one of the data tiers.

18. The one or more non-transitory computer-readable storage media of claim 17, wherein the promoting is initiated by one of the VNLS and an operator using a cloud service.

19. The one or more non-transitory computer-readable storage media of claim 16, wherein the processor operations further comprise receiving by the VNLS at least one updated filter in connection with a campaign initiated by an operator using a cloud service.

20. The one or more non-transitory computer-readable storage media of claim 19, wherein the campaign defines parameters associated with the campaign, and wherein the parameters comprise at least one of a time, a time range, a date, a date range, a time of day, an event type, a trigger ID, or a geographic location.

* * * * *